United States Patent [19]

McHugh

[11] Patent Number: 4,741,361

[45] Date of Patent: May 3, 1988

[54] VALVE AND ARRANGEMENT FOR FIRE SUPRESSION WATER SPRINKLER SYSTEM

[75] Inventor: George J. McHugh, Broomall, Pa.

[73] Assignee: AGF Manufacturing, Inc., West Chester, Pa.

[21] Appl. No.: 881,270

[22] Filed: Jul. 2, 1986

Related U.S. Application Data

[63] Continuation-in-part of Ser. No. 874,653, Jun. 16, 1986, abandoned.

[51] Int. Cl.[4] ........................ G01M 19/00; F16K 5/10

[52] U.S. Cl. .................................... 137/559; 137/271; 137/557; 251/206; 251/208; 251/315; 73/168

[58] Field of Search ............... 137/557, 559, 270, 271; 251/206, 207, 208, 209, 315; 73/168

[56] References Cited

U.S. PATENT DOCUMENTS

| | | | |
|---|---|---|---|
| 1,023,104 | 4/1912 | Carpenter | 251/207 |
| 2,621,012 | 12/1952 | Graham | 251/207 |
| 3,131,716 | 5/1964 | Griswold et al. | 137/559 X |
| 3,345,032 | 10/1967 | Rawstron | 251/315 |
| 3,385,318 | 5/1968 | Kilbourn | 137/557 |
| 4,130,128 | 12/1978 | Kaneko | 251/207 X |
| 4,177,832 | 12/1979 | Price | 251/315 X |
| 4,273,152 | 6/1981 | Freeman | 251/315 |
| 4,643,224 | 2/1987 | Rung | 137/559 |

*Primary Examiner*—Alan Cohan
*Assistant Examiner*—John Rivell
*Attorney, Agent, or Firm*—Burns, Doane, Swecker & Mathis

[57] ABSTRACT

A valve and an arrangement for testing and draining a fire suppression water sprinkler system includes a valve which has a valve member with first, second and third ports. The selective rotation of the valve member interrupts a flow of water through the valve and permits a flow at two different preselected flow rates.

24 Claims, 8 Drawing Sheets

VALVE AND ARRANGEMENT FOR FIRE SUPRESSION WATER SPRINKLER SYSTEM

BACKGROUND AND SUMMARY OF THE PRESENT INVENTION

This application is a continuation-in-part application of my copending application entitled Valve and Arrangement for Fire Suppression Water Sprinkler System, Ser. No. 874,653, filed on June 16, 1986, now abandoned.

The present invention relates generally to valves and more particularly relates to valve arrangements for use in testing and draining fire suppression water sprinkler systems.

In a typical fire suppression water sprinkler system as installed in many buildings, an array of individual fire sprinklers is supplied with water through a main conduit and various branch conduits. The individual fire sprinklers are generally provided with a member that melts when the ambient temperature reaches a predetermined level indicative of a fire. The melting of the member opens the fire sprinkler to spray water in order to suppress the fire. The individual fire sprinklers are provided with meltable members so that the spray of water will hopefully be limited to the region of the building where the fire is present. In this way, the extent of water damage may be minimized.

After a fire, and especially during maintenance and renovation, it may become necessary to replace one or more of the individual water sprinklers. At such times it is desirable to be able to drain the system of water conduits, so that the removal of one or more of the individual water sprinklers (after the supply of water to the main conduit has been turned off and after the system has been drained) will not result in a flow of water through the fitting for the water sprinkler. Accordingly, it is conventional in the art to provide a valve which when opened will drain the water conduits of the system.

Such fire suppression systems also oftentimes have a switch or sensor that detects the flow of water in the conduits to indicate that even only one of the individual water sprinklers has opened. Since the flow of water in the conduits generally means that a fire is present in the building, the switch or sensor typically triggers a fire alarm or sends an appropriate signal directly to a fire department. Therefore, many fire codes require, and it is otherwise desirable, that the switch or sensor which detects the flow of water in the conduits be periodically tested. Accordingly, it has also become conventional in the art to provide a valve which enables the system to be tested by permitting a flow of water corresponding to the flow though only one individual water sprinkler that has been opened.

In addition, it is desirable (and sometimes required by the applicable fire code) to be able to visually observe the flow of water from the testing valve. Since the testing valve (and oftentimes the drainage valve) is frequently connected directly to a drain pipe, it is conventional to provide a sight glass downstream of the testing valve (and sometimes the drainage valve). Also, since it is typically desirable to determine the pressure of the water upstream of the testing valve, prior to and during a test operation, it is conventional to provide a fitting or port to receive a pressure gauge upstream of the testing valve.

The use of separate drainage valves and testing valves results in significant time and expense during the installation of such plumbing. More recently, the testing valve and the drainage valve have been incorporated into a single device along with a sight glass and a pressure port. One such device is provided by the Fire Protection Division of Victaulic in Easton, Pa. under the designation "Testmaster". Such a device remains relatively expensive and cumbersome, however, since the device includes two separate valves that have been provided in a single housing.

Accordingly, it is an object of the present invention to provide a valve and arrangement for a fire suppression water sprinkler system which overcomes the disadvantages of the prior art.

Yet another object of the present invention is to provide an arrangement for testing and draining a fire suppression water sprinkler system which is relatively simple and easy to install and use.

Still another object of the present invention is to provide an arrangement for testing and draining a fire suppression water sprinkler system which is relatively inexpensive.

Yet still another object of the present invention is to provide a valve which permits a fire suppression water sprinkler system to be tested and drained.

A still further object of the present invention is to provide a valve which provides two different flow rates for a supply of fluid through the valve.

These and other objects are accomplished by a valve and an arrangement for testing and draining a fire suppression system according to the present invention.

The arrangement according to the present invention comprises a conduit for supplying water to a plurality of sprinklers with a sensor provided for sensing the flow of water in the conduit. A valve is provided downstream of the sensor in communication with the conduit.

The valve has a housing which defines an interior chamber with an inlet and an outlet. A valve member provided within the interior chamber has first, second and third ports. The first port has a size which is different than at least one of the second and third ports. Means are provided for selectively rotating the valve member within the interior chamber whereby communication between the inlet and the outlet may be varied.

BRIEF DESCRIPTION OF THE DRAWINGS

Preferred embodiments of the present invention will be described in greater detail with reference to the accompanying drawings, wherein like members bear like reference numerals and wherein.

DETAILED DESCRIPTION OF THE PREFERRED EMBODIMENTS

Figure 1:
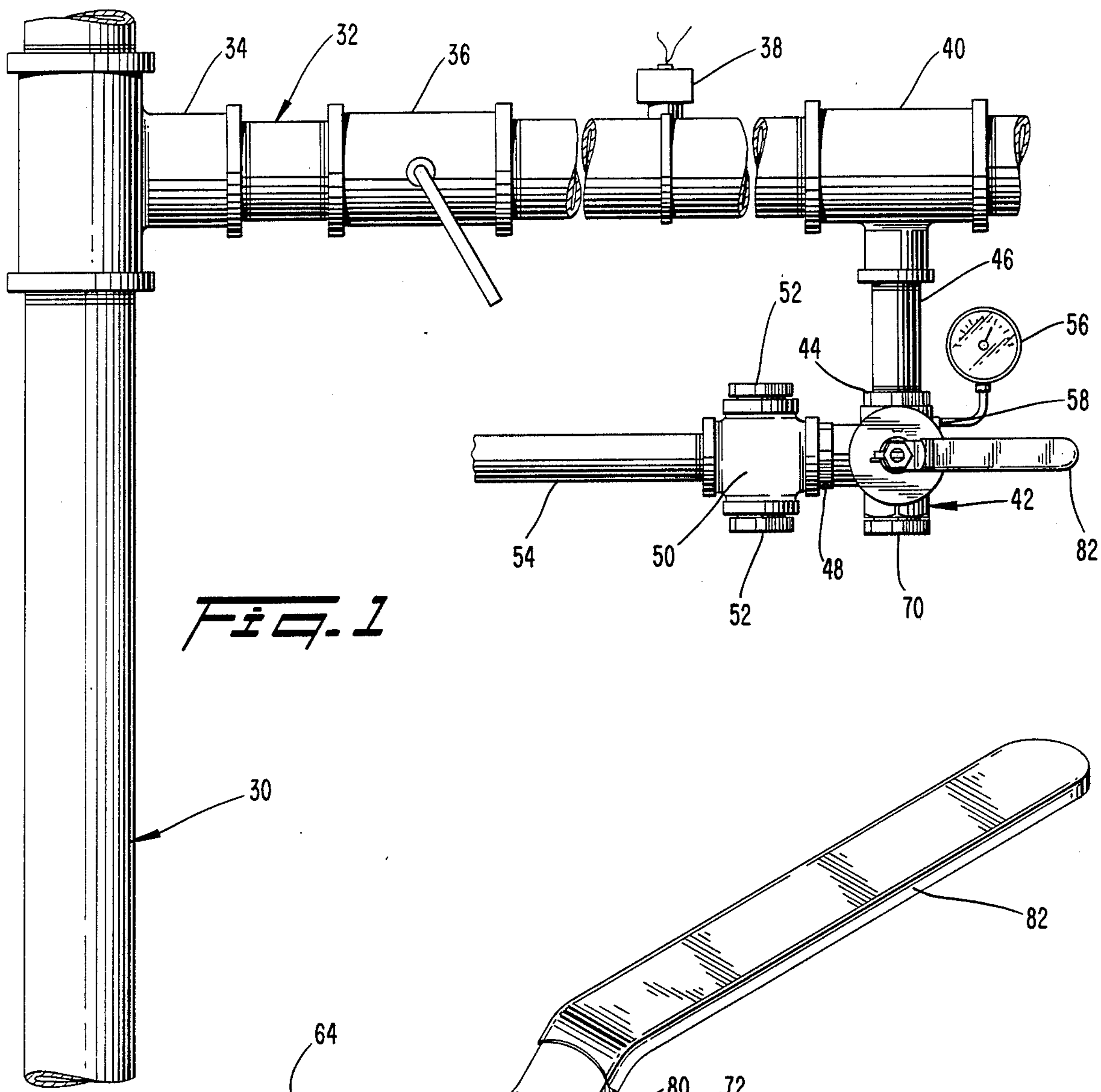
FIG. 1 is a front view of an arrangement for testing and draining a fire suppression water sprinkler system according to the present invention.

With reference to FIG. 1, an arrangement for testing and draining a fire suppression water sprinkler system includes a main conduit 30 for supplying water. The conduit 30 supplies a branch conduit 32 by way of a Tee fitting 34. A main valve 36 is provided for the branch conduit 32 with the main valve 36 operable to permit or to interrupt the flow of water through the branch conduit 32.

Downstream of the main valve 36 is provided a water flow switch 38. The water flow switch 38 is of suitable conventional design and typically includes a paddle or other member (not shown) which extends into the branch conduit 32. The paddle is connected to a switch which is closed when the flow of water through the branch conduit is sufficient to move the paddle a predetermined amount. Closure of the switch provides an electrical signal which may be used to trigger a fire alarm or to alert a fire department.

Downstream of the water flow switch 38 but upstream of a plurality of individual water sprinklers (not shown) is a Tee fitting 40. The Tee fitting 40 is preferably provided at a location which is physically lower than the portion of the branch conduit 32 downstream of the Tee fitting 40 and also physically lower than all of the individual water sprinklers and the associated system of supply conduits which is supplied with water by the branch conduit 32. In this way, the entire water sprinkler system downstream of the Tee fitting 40 may be drained as desired through the Tee fitting 40.

As is conventional in the art, the individual fire sprinklers (not shown) are provided with a member that melts when the ambient temperature reaches a predetermined level indicative of a fire. Upon melting, the member opens the fire sprinkler to spray water to suppress the fire.

When it is desired to replace one or more of the individual water sprinklers, the valve 36 is closed and then the water sprinkler system is preferably drained, so that the removal of one or more of the individual water sprinklers will not result in a flow of water through the fitting for the water sprinkler.

Figure 3:
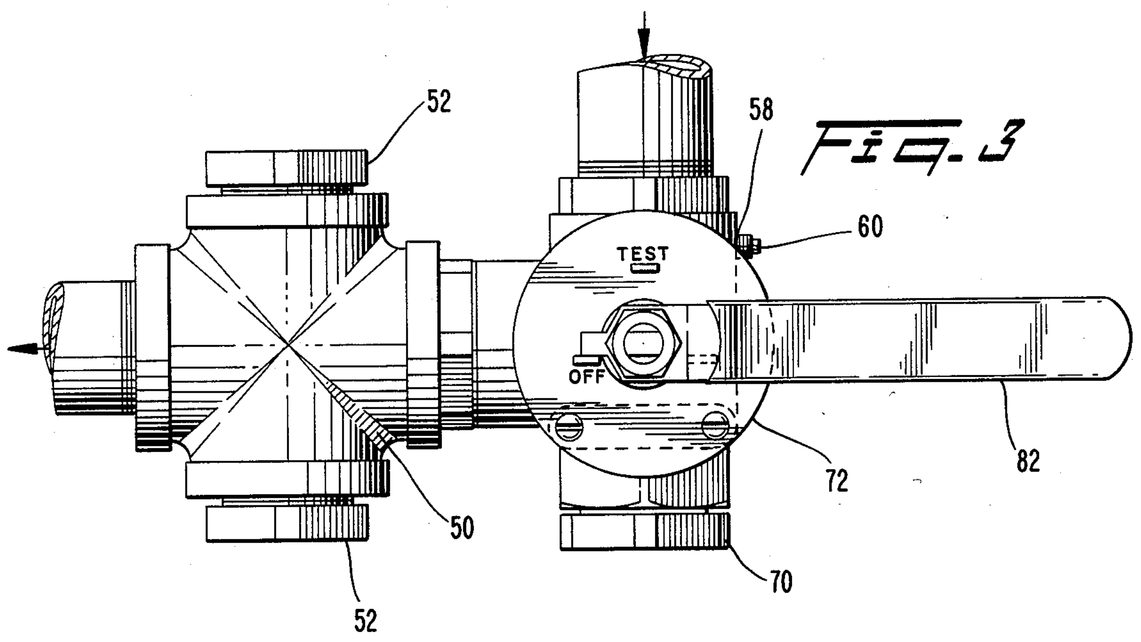
FIG. 3 is a front view of the valve of the arrangement of FIG. 1 with the pressure gauge removed.
Figure 4:
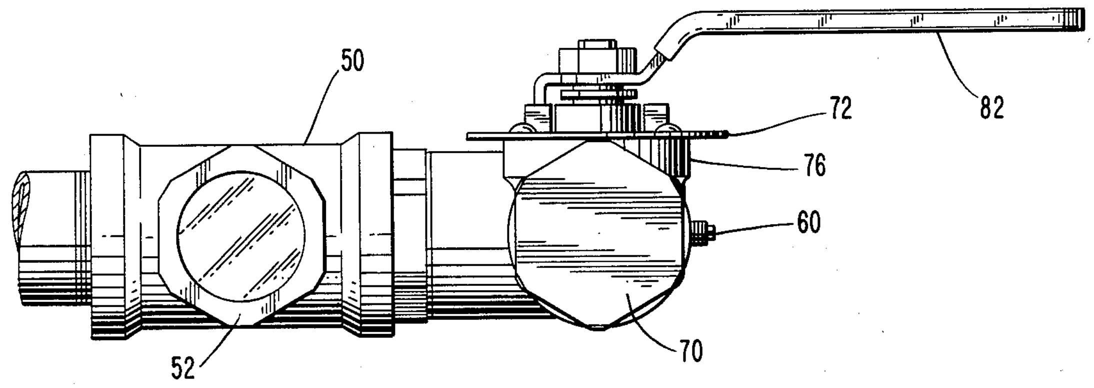
FIG. 4 is a bottom view of the valve of FIG. 3.

The Tee fitting 40 provides communication between the branch conduit 32 and a valve 42 according to the present invention (see also FIG. 3). The valve 42 has an inlet 44 which is threaded onto a nipple 46 which is in turn threaded into the Tee fitting 40. Other arrangements for connecting the inlet of the valve to the branch conduit 32 will be readily obvious to one skilled in the art. An outlet 48 of the valve 42 is connected to a fitting 50 having a sight glass 52 (see also FIG. 4) threadably received at upper and lower couplings of the fitting. The sight glasses 52 permit a flow of water through the valve 42 to be visually observed.

An outlet of the fitting 50 is connected directly to a drain 54. Alternatively, the fitting 50 may be omitted and the outlet of the valve 42 may be left unconnected. In this way, the flow of water throught the valve 42 would be visually observed without the use of a sight glass. If, however, a visual inspection of the flow of water is unnecessary, the outlet of the valve 42 may be connected directly to the drain 54.

The valve 42 is provided with a pressure gauge 56 which senses the pressure in the valve 42 at the inlet of the valve. The pressure gauge 56 is threadably received by a pressure port 58. If the pressure gauge 56 is omitted, a plug 60 is threadably received by the pressure port 58 (see FIG. 3).

Figure 2:
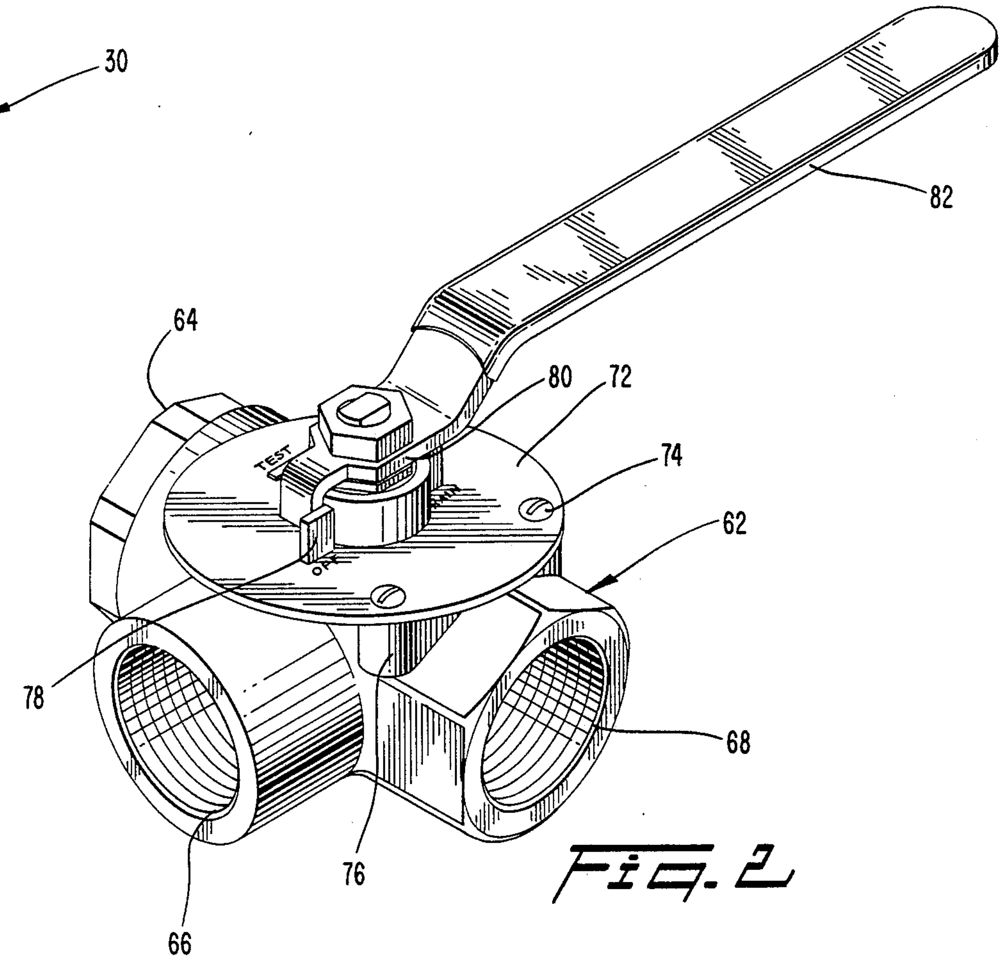
FIG. 2 is a pictorial view of a left-handed valve according to the present invention.

With reference now to FIG. 2, a valve 42 according to the present invention includes a housing 62 having three threaded openings 64, 66 and 68 which are coplanar and spaced apart by 90 degrees. When in use as in the arrangement of FIG. 1, the second opening 66 is the outlet of the valve and the first opening 64 is the inlet. The third opening 68 (which is not used as the inlet in FIG. 1) is normally closed by a plug 70. A stop plate 72 is mounted on the valve housing as by a pair of screws 74 which are threadably received by a mounting bracket 76 provided in the valve housing. The stop plate includes first and second shoulders 78, 80 which limit the movement of a control lever 82. The control lever is permitted by the stop plate to travel between "off", "test" and "drain" positions.

Figure 5:
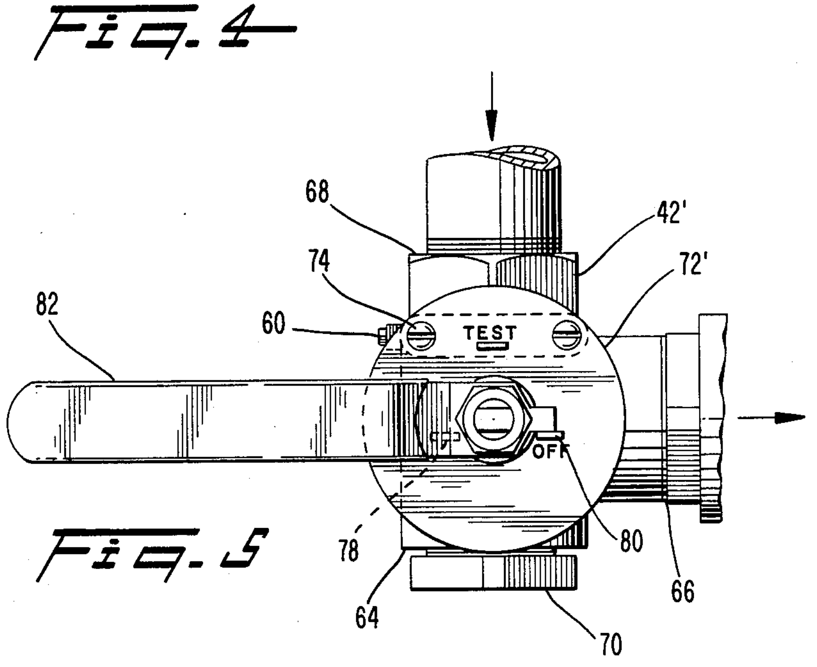
FIG. 5 is a front view of a right-handed valve according to the present invention.

If desired, the housing could be configured with only two openings 64, 66 provided at right angles to one another. By providing three openings 64, 66, 68, however, the valve may be readily converted from a left-handed valve to a right-handed valve as more fully discussed below. For example, the left-handed valve 42 of FIG. 1 could be readily adapted to be a right-handed valve 42' (see FIG. 5), if desired. In the valve 42', the second opening 66 is still the outlet for the valve, but the inlet is now the third opening 68. The first opening 64 is then closed by a suitable plug 70. The interior of the valve 42' must also be changed in the manner described below so as to accomplish the change from a left-handed valve to a right-handed valve and the stop plate 72 must also be changed to accomodate the reversed operation.

Figure 6:
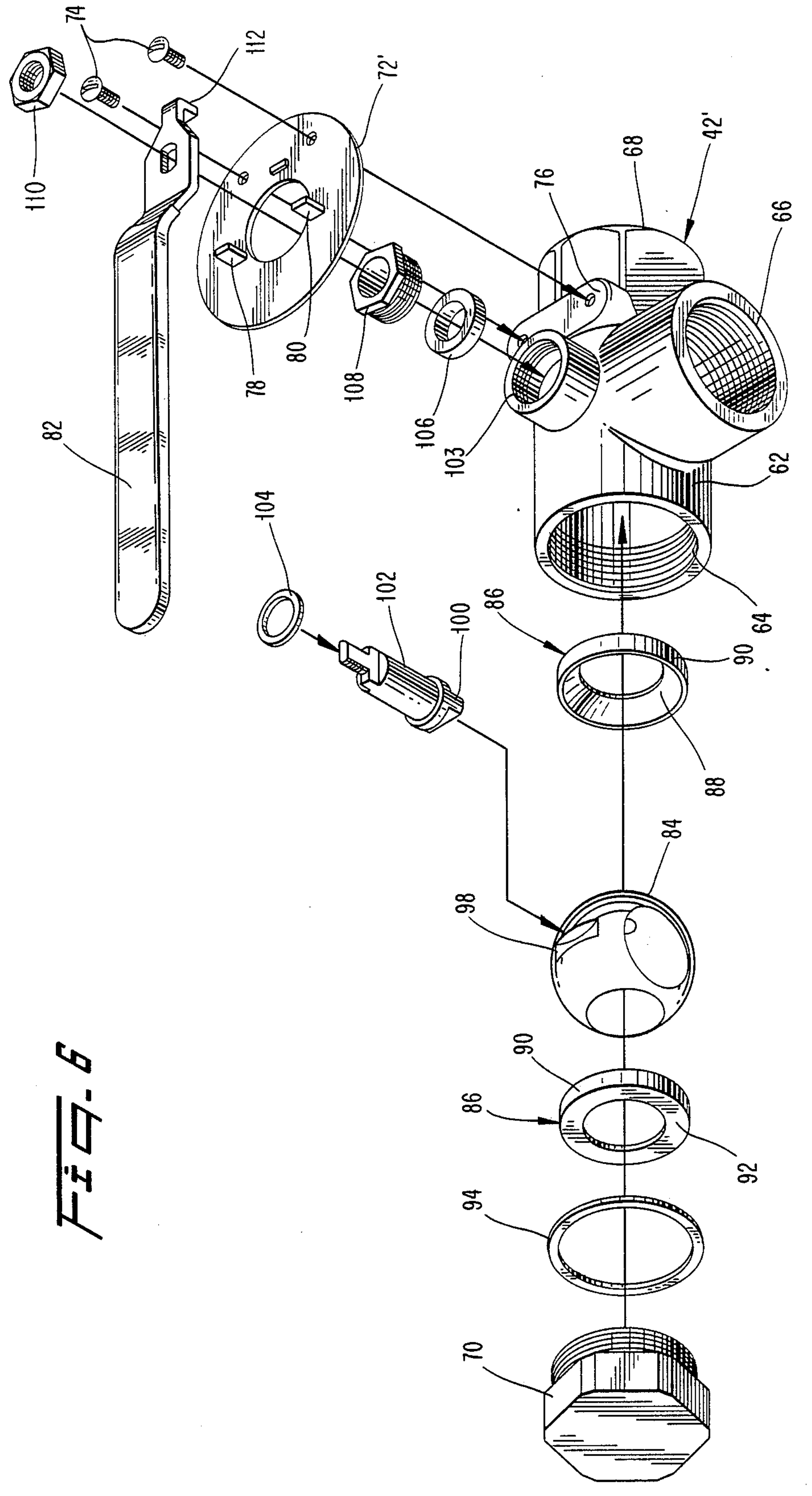
FIG. 6 is an exploded view of the valve of FIG. 5.

With reference now to FIG. 6, the right-handed valve 42' includes a ball member 84 which is received within an interior chamber of the housing 62 of the valve. In the valve 42' of FIG. 6, the housing is configured so as to receive the ball member 84 through the first opening 64. The ball member 84 is carried by a pair of annular seats 86 which have an inner surface 88 that conforms to the spherical shape of the ball member 84. The seats 86 also have a peripheral surface 90 which is snugly received by the interior chamber of the housing 62. In addition, the seats 86 have an outer surface 92. The seat 86 which is positioned in the interior chamber of the housing ahead of the ball member abuts a shoulder (not shown) of the interior housing. The other seat 86 which is positioned in the interior chamber behind the ball member 84 is retained in position by a seal 94. The seal is provided between the seat 86 and a threaded retainer (i.e. plug 70) which releasably maintains the ball member and associated seats within the interior chamber of the housing. The retainer and one or more of the threaded openings 64, 66, 68 are provided with a hexagonal peripheral surface so as to facilitate assembly and disassembly of the valve 42'.

The ball member 84 is provided with a slot 98 which is adapted to receive a lowermost tab 100 of a stem 102. The stem is inserted into the valve housing 62 through a threaded opening 103 which is perpendicular to the openings 64, 66, 68. The stem is provided with an annular bearing 104 and is sealed by a packing 106. A threaded retainer 108 maintains the stem in secure engagement with the slot of the ball member 84.

The stop plate 72' is then mounted on the housing by way of the screws 74. The control lever 82 is then mounted on the stem 102 by a nut 110. The control lever 82 has a depending tab 112 which selectively abuts the stops 78, 80 of the stop plate 72 to limit movement of the control lever. In this way, movement of the ball member 84 is likewise limited to movement between the "off", "test" and "drain" positions.

Figure 7:
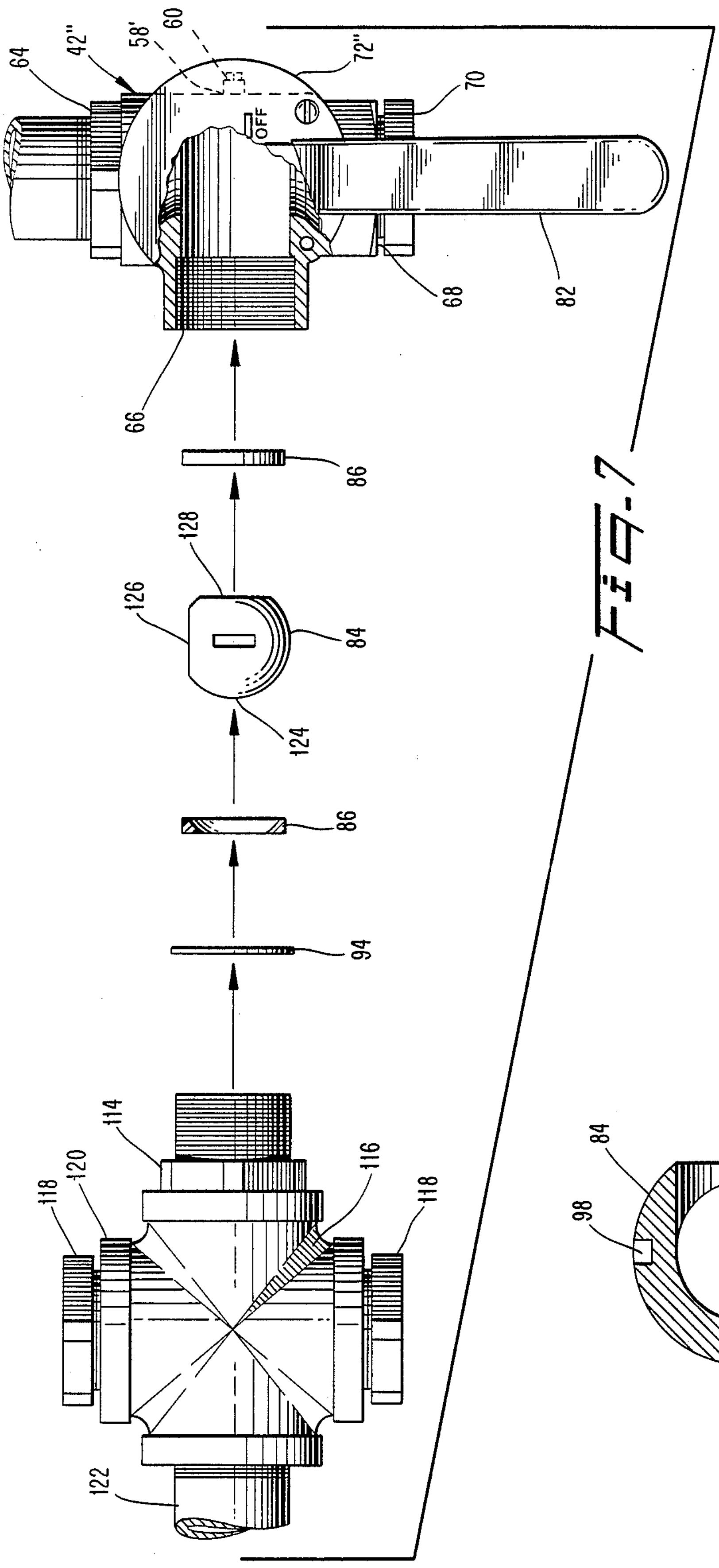
FIG. 7 is an exploded view of another left-handed valve according to the present invention.

With reference now to FIG. 7, a valve 42" is configured so that the ball member 84 is received by the interior chamber of the housing 62 by way of the second opening 66. In this configuration, the seats 86 are likewise received in front of and behind the ball member 84 with the seal 94 positioned between the final seat 86 and a retainer 114. The first seat 86 (which is in front of the ball member) may be configured differently from the second seat 86, since the first seat generally only provides a bearing surface for the ball member 84.

The retainer 114 is provided as the inlet to a housing 116 which is adapted to mount a pair of sight glasses 118 in a pair of threaded openings 120. Downstream of the sight glasses 118 is provided an outlet 122 for the housing 116.

In the valve 42" of FIG. 7, a pressure port 58' is preferably provided directly opposite the outlet 48 of the valve. In this way (as more fully discussed below) the pressure port 58' will be in fluid communication with the inlet of the valve 42" regardless of whether the valve is configured for left-handed or right-handed operation.

The configuration of the valve 42" may be preferable over that of either valve 42 or 42' since the housing 116, as the retainer for the ball member 84, may not need to be disassembled from the valve 42" during installation in a fire suppression water sprinkler system. Moreover, since the pressurized side of the valves 42, 42' and 42" is the inlet side of the valve, it may be desirable or necessary that a seat for the ball member be provided adjacent the outlet of the valve. In this way, the water pressure tends to urge the ball member against the seat in a sealing manner rather than possibly away from the seat so as to result in leakage.

Figure 8:
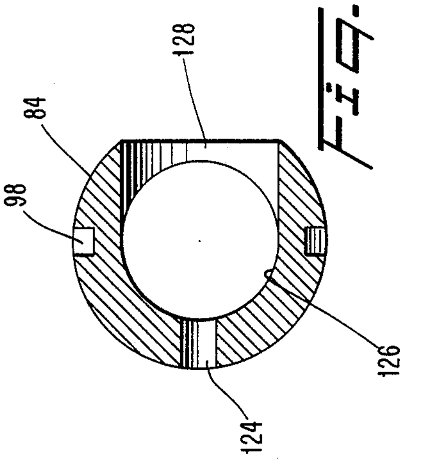
FIG. 8 is a cross-sectional view of the valve member of the valve of FIG. 7.

In FIG. 8, the ball member 84 is provided with a first port 124 having a cross-sectional area corresponding to the opening provided by one of the individual sprinklers in the fire suppression water sprinkler system. The first port 124 communicates with second and third ports 126, 128 provided in the ball member 84. The second and third ports 126, 128 have a cross-sectional area which is relatively large in comparison with the first port 124 so that the second and third ports can quickly drain the water sprinkler system. The first, second and third ports are perpendicular to one another and are coplanar so that rotation of the ball member about an axis can selectively bring the ports into (and out of) communication with the inlet and outlet of the valve.

While the preferred embodiments as described in the present application include a spherical shaped valve member, the present invention is readily adapted to other suitable, conventional valve configurations. For example, a plug valve (not shown) wherein the valve member comprises a truncated cone could be readily modified in accordance with the present invention by providing first, second and third ports in the valve member in the manner disclosed above.

Figure 9:
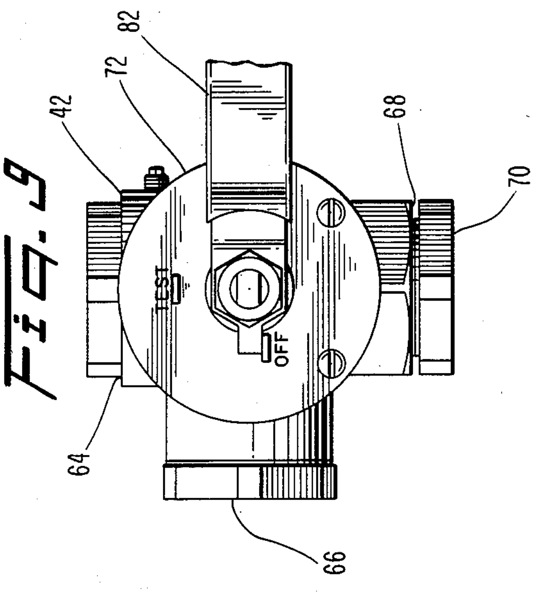
FIG. 9 is a front view of the valve of FIG. 2 with the lever in the off position.
Figure 12:
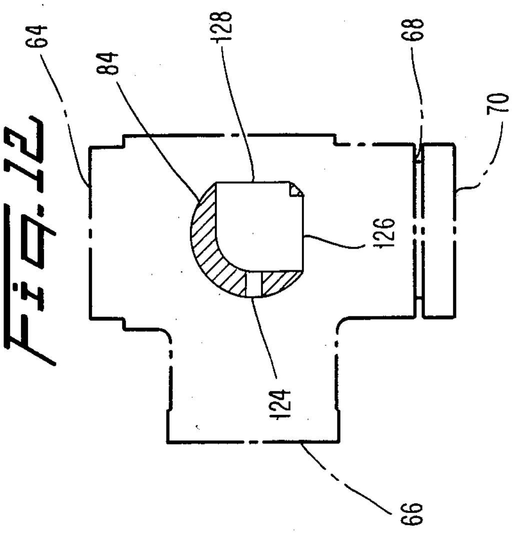
FIG. 12 is a schematic view of the valve of FIG. 9 in partial cross-section.

With reference now to FIG. 9, the left-handed valve 42 of FIG. 3 (with the sight glass housing not shown) has the control lever 82 in the "off" position. Since in the valve 42, the seats are provided adjacent the first and third openings 64, 68, the ball member is positioned by the control lever so that a solid portion of the spherical outer surface of the ball member is oriented toward the inlet of the valve. With reference to FIG. 12, the first port 124 is positioned adjacent the second opening 66 and the second port 126 is positioned adjacent the third opening 68. The third port 128 is therefore positioned directly away from the second opening 66. Accordingly, water is not permitted to flow through the ball member from the inlet of the valve to the outlet.

Figure 10:
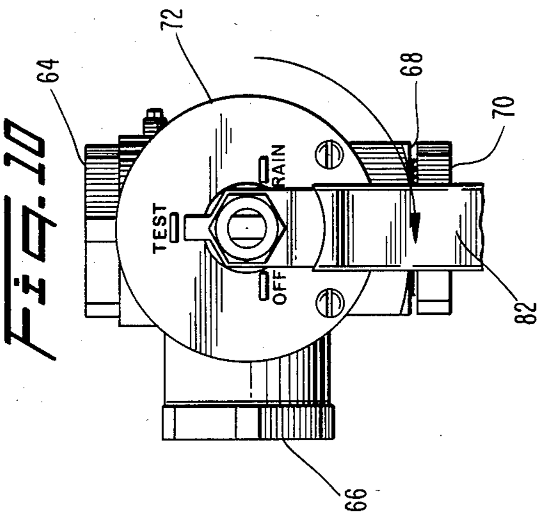
FIG. 10 is a front view of the valve of FIG. 2 with the lever in the test position.
Figure 13:
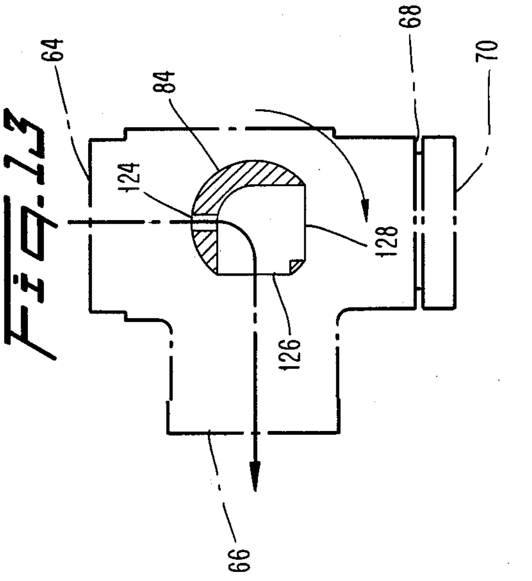
FIG. 13 is a schematic view of the valve of FIG. 10 in partial cross-section.

With reference now to FIG. 10, the control lever has been rotated clockwise through 90 degrees to the "test" position. With reference to FIG. 13, a clockwise rotation of the ball member 84 through 90 degrees has presented the first port 124 adjacent the inlet of the valve. Water is therefore free to flow through the relatively small opening of the first port through the second port and then through the outlet of the valve.

Figure 11:
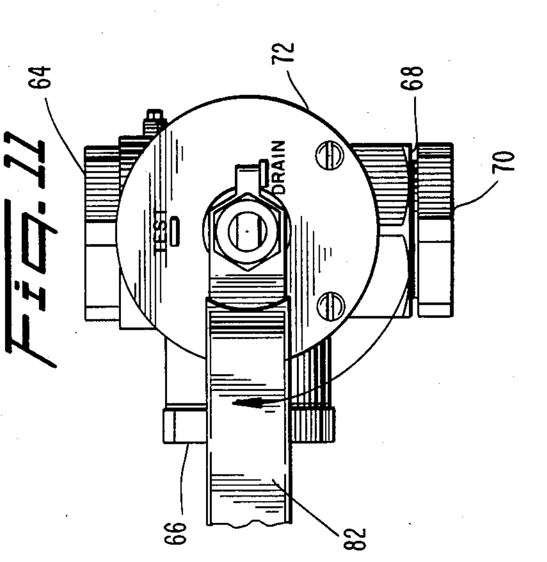
FIG. 11 is a front view of the valve of FIG. 2 with the lever in the drain position.
Figure 14:
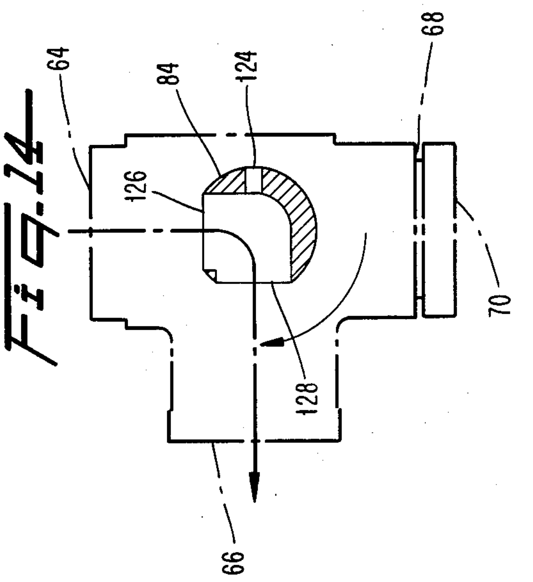
FIG. 14 is a schematic view of the valve of FIG. 11 in partial cross-section.

With reference now to FIG. 11, the control lever has been rotated clockwise through an additional 90 degrees to the "drain" position. With reference to FIG. 14, a clockwise rotation of the ball member 84 through an additional 90 degrees has presented the second port 126 adjacent the inlet of the valve. Water is then free to flow through the second and third ports from the inlet to the outlet of the valve.

Figures 15, 16, 17, 18, 19, 20:
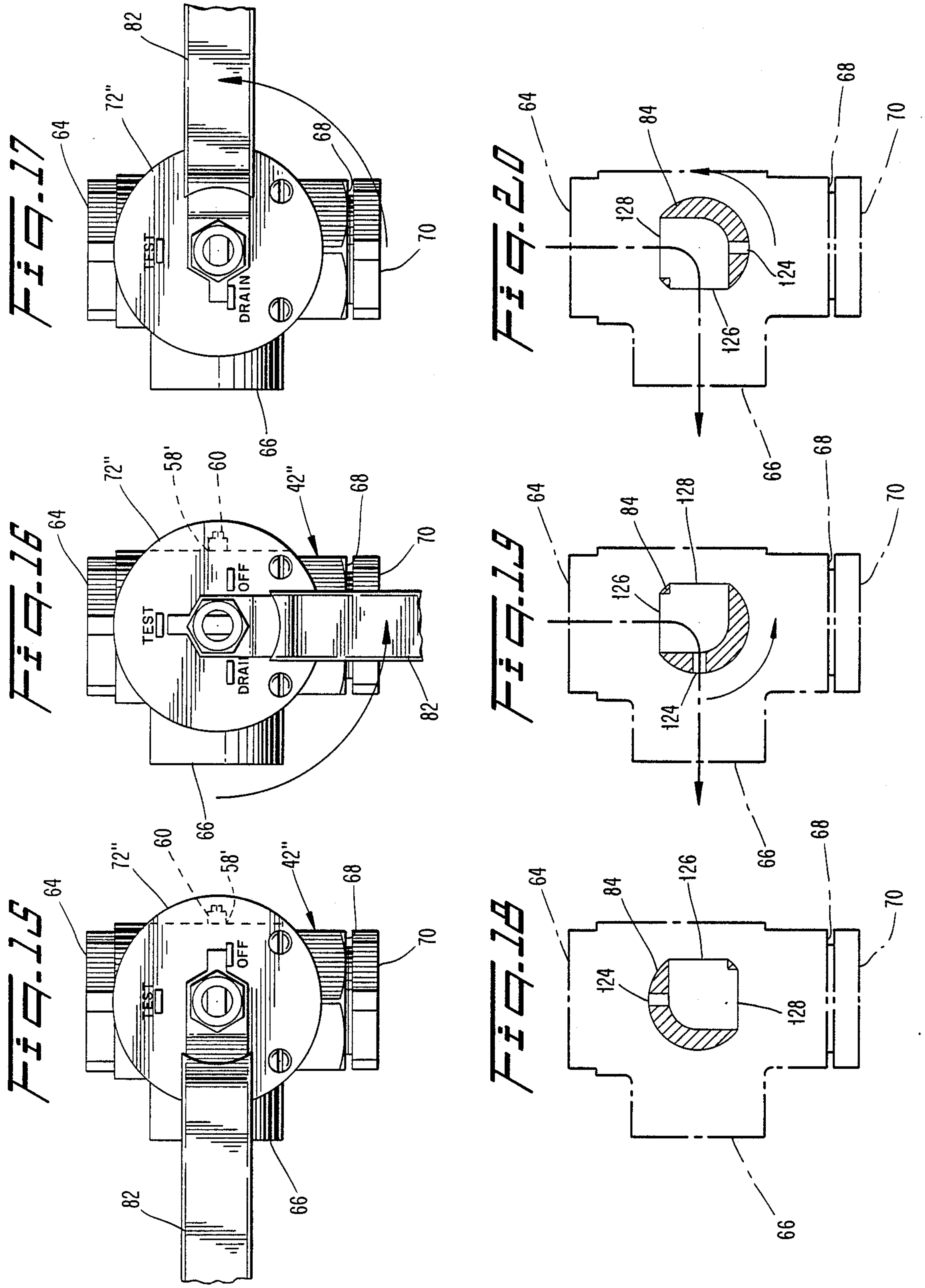
FIG. 15 is a front view of the valve of FIG. 7 with the lever in the off position.
FIG. 16 is a front view of the valve of FIG. 7 with the lever in the test position.
FIG. 17 is a front view of the valve of FIG. 7 with the lever in the drain position.
FIG. 18 is a schematic view of the valve of FIG. 15 in partial cross-section.
FIG. 19 is a schematic view of the valve of FIG. 16 in partial cross-section.
FIG. 20 is a schematic view of the valve of FIG. 17 in partial cross-section.

With reference now to FIG. 15, the left-handed valve 42" of FIG. 7 (with the sight glass housing not shown) has the control lever 82 in the "off" position. Since in the valve 42", the seats are provided adjacent and directly opposite the second opening 66, the ball member is positioned by the control lever so that a solid portion of the spherical outer surface of the ball member is oriented toward the outlet of the valve. With reference to FIG. 18, the first port 124 is positioned adjacent the first opening 64 and the second port 126 is positioned directly opposite the second opening 66. The third port 128 is therefore positioned adjacent the third opening 68. Accordingly, water is not permitted to flow through the ball member from the inlet of the valve to the outlet.

With reference now to FIG. 16, the control lever has been rotated counter-clockwise through 90 degrees to the "test" position. With reference to FIG. 19, a counterclockwise rotation of the ball member 84 through 90 degrees has presented the first port 124 adjacent the outlet of the valve. Water is therefore free to flow through the relatively large opening of the second port to the relatively small opening of the first port and then through the outlet of the valve.

With reference now to FIG. 17, the control lever has been rotated counter-clockwise through an additional 90 degrees to the "drain" position. With reference to FIG. 20, a counter-clockwise rotation of the ball member 84 through an additional 90 degrees has presented the third port 128 adjacent the inlet of the valve with the second port 126 adjacent the outlet of the valve. Water is then free to flow through the third and second ports from the inlet to the outlet of the valve.

With reference again to FIG. 8, the same ball member 84 can be selectively positioned so as to provide the appropriate port adjacent the inlet or the outlet of a valve 42 wherein the seats are arranged adjacent the first and third openings or a valve 42″ wherein the seats are arranged adjacent and opposite the second opening. Likewise, as will be readily obvious to one skilled in the art upon reading this detailed description of the preferred embodiments, the same ball member can be readily positioned so as to present the appropriate ports to the inlet and outlet of a left-handed valve 42 or a right-handed valve 42′ (with the seats in either configuration). Accordingly, the ball member 84 is provided with two slots 98 so as to permit the ball member to be inverted as appropriate.

With reference to FIGS. 9 to 14, in adapting a left-handed valve 42 to a right-handed orientation (not shown), the valve housing would be effectively rotated through 180 degrees about the axis of the stem 102. Accordingly, the first opening 64 would be closed by the plug 70. The third opening 68 would be the inlet for the valve. The second opening would remain as the outlet for the valve. The ball member would then be rotated through 180 degrees about an axis passing through the second port. When in the "off" configuration, the first port would be adjacent the second opening and the second port would be adjacent the first opening 64. The control lever would be rotated though 90 degrees in a counter-clockwise manner to move the first port so as to be adjacent the inlet of the valve to provide the "test" configuration. Further rotation of the control lever through 90 degrees in the counter-clockwise direction would bring the second port adjacent the inlet in the "drain" position. The stop plate would be replaced by a different stop plate appropriately labeled and with the tabs suitably positioned so as to permit rotation of the control lever through 180 degrees.

Similarly, with reference to FIGS. 15 to 20, in adapting a left-handed valve 42″ to a right-handed orientation (not shown), the valve would be effectively rotated through 180 degrees about the axis of the stem 102. Accordingly, the first opening 64 would be closed by the plug 70. The third opening 68 would be the inlet for the valve. The second opening would remain as the outlet for the valve. The ball member would then be rotated through 180 degrees about an axis passing through the first and second ports. When in the "off" configuration, the first port would be adjacent the inlet and the third port would be adjacent the first opening. The control lever would be rotated though 90 degrees in a clockwise manner to move the first port so as to be adjacent the outlet of the valve to provide the "test" configuration. Further rotation of the control lever through 90 degrees in the clockwise direction would bring the second port adjacent the outlet in the "drain" position. The stop plate would be replaced by a different stop plate appropriately labeled and with the tabs suitably positioned so as to permit rotation of the control lever through 180 degrees.

With continual reference to FIGS. 15–20, in either a left-handed or right-handed (not shown) configuration, the ball member 84 provides fluid communication between the inlet of the valve 42″ and the pressure port 58′ when the control lever is in either the "off" or "test" positions. In this way, only a single pressure post 58′ need be provided in the valve housing which is readily adaptable between left-handed and right-handed configurations.

Figure 21:
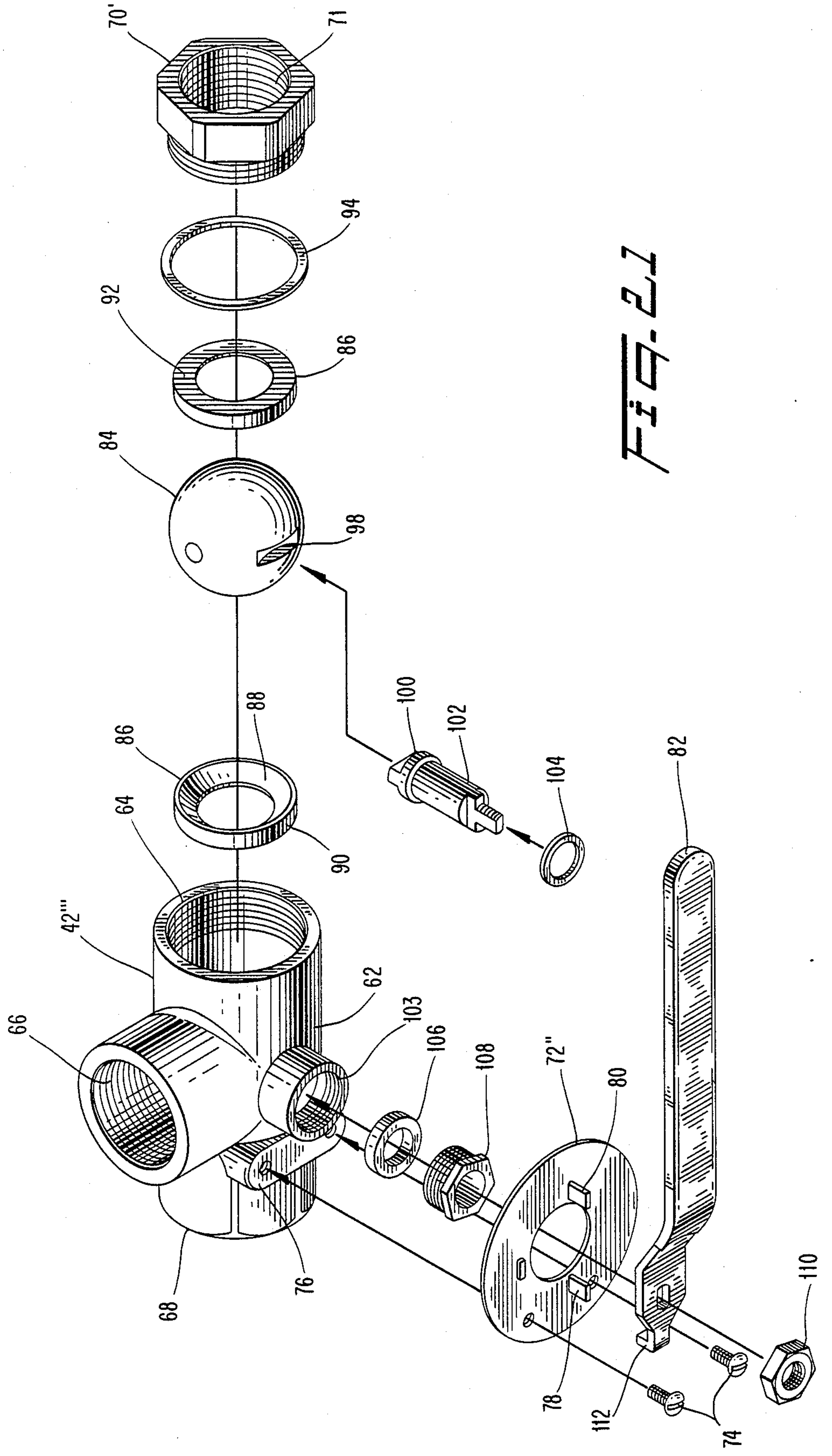
FIG. 21 is an exploded view of another valve according to the present invention.

With reference now to FIG. 21, another preferred embodiment of the present invention is provided by a valve 42‴ in which the second opening 66 is the inlet of the valve and one of the first and third openings 64, 68 is the outlet of the valve. This configuration is highly preferred since the valve is readily converted from a left-handed configuration to a right-handed configuration and may be easily adapted from a conventional 3-way diversion valve such as is available from Conbraco Industries, Inc. under the trade name "APOLLO". The water pressure in the valve (when in use) urges the ball member against the seat adjacent the outlet in either a left-handed or right-handed configuration as described below.

With continued reference to FIG. 21, the valve 42‴ is similar in configuration to that of FIG. 6 in that a ball member 84 is received within an interior chamber of the housing 62 of the valve. In the valve 42‴ of FIG. 21, the housing is configured so as to receive the ball member 84 through the first opening 64. The ball member 84 is carried by a pair of annular seats 86 which have an inner surface 88 that conforms to the spherical shape of the ball member 84. The annular seats 86 are provided with a peripheral surface 90 which is snugly received by the interior chamber of the housing 62. The seat 86 which is positioned in the interior chamber of the housing ahead of the ball member abuts a shoulder (not shown) of the interior housing. The other seat 86 which is positioned in the interior chamber behind the ball member 84 is retained in position by a seal 94. The seal is provided between the seat 86 and a threaded retainer 70′ which releasably maintains the ball member and associated seats within the interior chamber of the housing. The retainer 70′ and one or more of the threaded openings 64, 66, 68 are provided with a hexagonal peripheral surface so as to facilitate assembly and disassembly of the valve 42‴.

Since the opening 64 is the outlet of the valve 42‴ in the illustrated configuration, the retainer 70′ has a threaded opening 71 therein to receive a pipe to drain. As desired, the retainer 70′ could be replaced by a suitably configured sight glass arrangement 50 (see FIG. 1). If the valve 42‴ were arranged for left-handed operation, the retainer 70' would close the opening 64 and would be in the form of a plug 70 (see FIG. 6).

The ball member 84 is provided with a slot 98 which is adapted to receive a lowermost tab 100 of a stem 102. The stem is inserted into the valve housing 62 through a threaded opening 103 which is perpendicular to the openings 64, 66, 68. The stem is provided with an annular bearing 104 and is sealed by a packing 106. A threaded retainer 108 maintains the stem in secure engagement with the slot of the ball member 84.

A stop plate 72" is then mounted on the housing by way of the screws 74. The control lever 82 is then mounted on the stem 102 by a nut 110. The control lever 82 has a depending tab 112 which selectively abuts the stops 78, 80 of the stop plate 72 to limit movement of the control lever. In this way, movement of the ball member 84 is likewise limited to movement between the "off", "test" and "drain" positions.

A pressure port 58' may be provided directly opposite the inlet opening 66 of the valve 42''' (see FIGS. 25–27) so that the pressure port is in fluid communication with the inlet of the valve regardless of whether the valve is configured for left-handed or right-handed operation. Alternatively, the pressure port 58' could be located at another position on the valve housing (such as adjacent the second opening 66) in order to provide a desired communication with the pressure within the valve housing.

Figure 22:
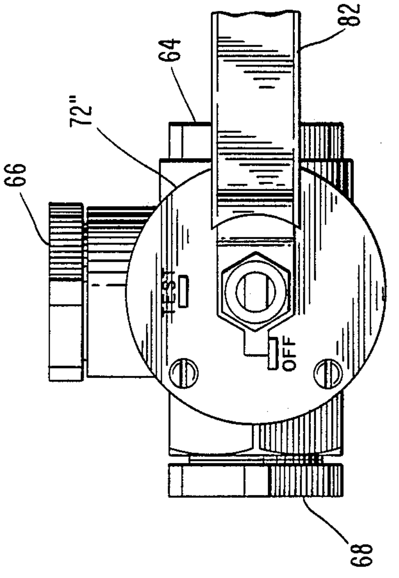
FIG. 22 is a front view of the valve of FIG. 21 with the lever in the off position.
Figure 25:
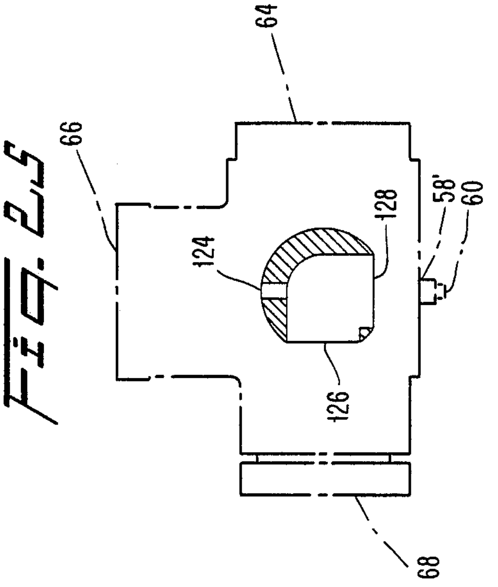
FIG. 25 is a schematic view of the valve of FIG. 22 in partial cross-section.

With reference now to FIG. 22, the right-handed valve 42''' of FIG. 21 (with a sight glass housing not shown) has the control lever 82 in the "off" position. Since in the valve 42''', the seats are provided adjacent the first and third openings 64, 68, the ball member is positioned by the control lever so that a solid portion of the spherical outer surface of the ball member is oriented toward the outlet of the valve. With reference to FIG. 25, the first port 124 is positioned adjacent the second opening 66 and the second port 126 is positioned adjacent the third opening 68. The third port 128 is therefore positioned directly away from the second opening 66. Accordingly, water is not permitted to flow through the ball member from the inlet of the valve to the outlet.

Figure 23:
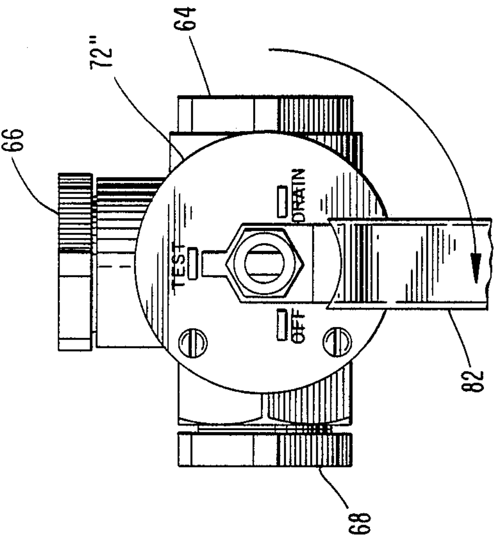
FIG. 23 is a front view of the valve of FIG. 21 with the lever in the test position.
Figure 26:
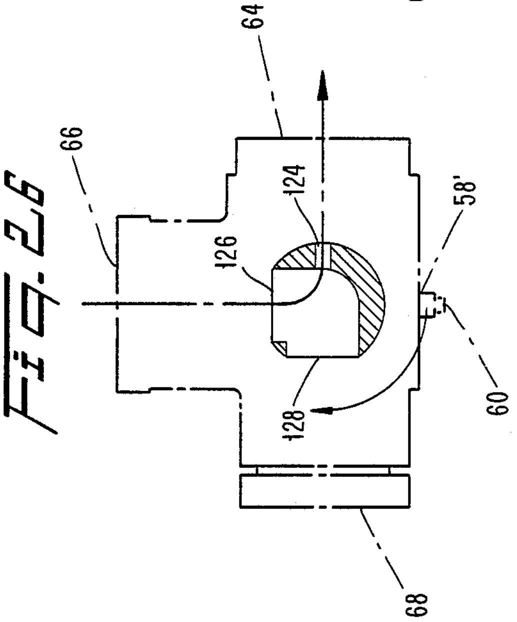
FIG. 26 is a schematic view of the valve of FIG. 23 in partial cross-section.

With reference now to FIG. 23, the control lever has been rotated clockwise through 90 degrees to the "test" position. With reference to FIG. 26, a clockwise rotation of the ball member 84 through 90 degrees has presented the first port 124 adjacent the outlet of the valve. Water is therefore free to flow through the second port and through the relatively small opening of the first port and then through the outlet of the valve.

Figure 24:
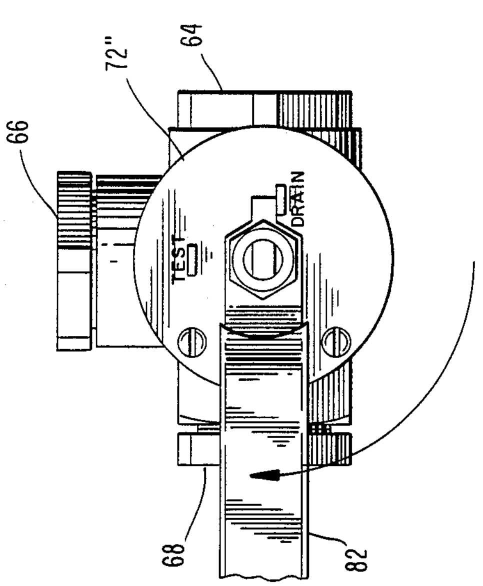
FIG. 24 is a front view of the valve of FIG. 21 with the lever in the drain position.
Figure 27:
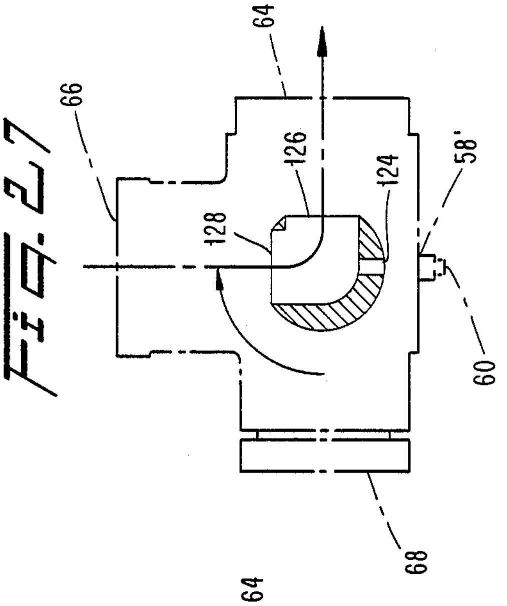
FIG. 27 is a schematic view of the valve of FIG. 24 in partial cross-section.

With reference now to FIG. 24, the control lever has been rotated clockwise through an additional 90 degrees to the "drain" position. With reference to FIG. 27, a clockwise rotation of the ball member 84 through an additional 90 degrees has presented the second port 126 adjacent the outlet of the valve. Water is then free to flow through the third and second ports from the inlet to the outlet of the valve.

As will be readily obvious to one skilled in the art upon reading this detailed description of the preferred embodiments, the same ball member can be readily positioned so as to present the appropriate ports to the inlet and outlet of a left-handed valve or a right-handed valve 42'''. Accordingly, the ball member 84 is provided with two slots 98 so as to permit the ball member to be inverted as appropriate.

With reference again to FIGS. 22 to 27, in adapting a right-handed valve 42''' to a left-handed orientation (not shown), the retainer 70' would be replaced by a plug retainer 70 (not shown). Accordingly, the first opening 64 would be closed by the plug retainer 70. The third opening 68 would be the outlet for the valve. The second opening would remain as the inlet for the valve. The ball member (see FIG. 25) would then be rotated through 180 degrees about an axis passing through the first and third ports. When in the "off" configuration, the first port would be adjacent the second opening and the second port would be adjacent the first opening 64. In the "off" position, the handle of the control lever would extend to the left and the control lever would be rotated though 90 degrees in a counter-clockwise manner to move the first port so as to be adjacent the outlet of the valve to provide the "test" configuration. Further rotation of the control lever through 90 degrees in the counter-clockwise direction would bring the second port adjacent the outlet in the "drain" position. The stop plate would be replaced by a different stop plate appropriately labled and with the tabs suitably positioned so as to permit rotation of the control lever through 180 degrees.

In operation, the arrangement according to the present invention is initially configured with the control lever in the "off" position so as to prevent a flow of water through the valve. The control lever is then rotated through 90 degrees so as to permit a flow of water at a preselected flow rate through the valve in order to test the system. If the flow of water causes the flow switch to be triggered, the test was successful and the control lever can be returned to the off position or when desired can be rotated further to the drain position to permit a flow of water at a second preselected flow rate.

While the valve and arrangement according to the present invention have been described with reference to a fire suppression water sprinkler system, it is expected that the valve and the arrangement may be of general utility in systems other than water sprinkler systems. Accordingly, the principles, preferred embodiments and modes of operation of the present invention have been described in the foregoing specification. However, the invention which is intended to be protected is not to be construed as limited to the particular embodiments disclosed. Further, the embodiments described herein are to be regarded as illustative rather than restrictive. Variations and changes may be made by others without departing from the spirit of the present invention and it is expressly intended that all such variations and changes which fall within the spirit and scope of the present invention as defined in the claims, be embraced thereby.

What is claimed is:

1. An arrangement for testing and draining a fire suppression water sprinkler system, comprising:

conduit means for supplying water to a plurality of sprinklers;

means for sensing a flow of water in said conduit means;

valve means provided downstream of said means for sensing and in communication with said conduit means, said valve means comprising a housing defining an interior chamber having an inlet and an outlet, said inlet and said outlet being generally perpendicularly to one another, a valve member provided within said interior chamber, the valve member having first, second and third ports arranged about a circumference of said valve member, said first and second ports being generally perpendicular to one another and said second and third ports being generally perpendicular to one another, said first port having a size which is smaller than either of the second and third ports, seat means for sealingly receiving a surface of said valve member adjacent the outlet; and means for selectively moving said valve member within said interior chamber whereby communication between said inlet and outlet may be sequentially closed, open to a first preselected flow rate and then opened to a second preselected flow rate, said second preselected flow rate being greater than said first preselected flow rate.

2. The arrangement of claim 1, wherein the valve member is generally spherical.

3. The arrangement of claim 2, wherein said means for selectively moving said valve member is adapted to sequentially and selectively rotate said valve member to position one of said second and third ports adjacent said outlet to permit communication between said inlet and outlet at said second preselected flow rate, then to position said first port adjacent the outlet to permit communication between the inlet and the outlet at said first preselected flow rate and then to selectively position said first, second and third ports away from said outlet to interrupt communication between said inlet and said outlet.

4. The arrangement of claim 3 wherein said seat means includes a seat retainer member having an integral sight glass provided downstream of said outlet.

5. The arrangement of claim 4 further comprising means for permitting a pressure within said housing to be sensed.

6. The arrangement of claim 3 further comprising a sight glass provided downstream of said outlet.

7. The arrangement of claim 6 further comprising means for permitting a pressure within said housing to be sensed.

8. The arrangement of claim 3, wherein said housing includes an opening which is coplanar with said inlet and said outlet and perpendicular to one of said inlet and said outlet, said opening being threadably closed by a plug member whereby the orientation of the inlet and the outlet with respect to the housing may be selectively varied.

9. The arrangement of claim 1 further comprising sight glass means for permitting a visual observation of a flow out of said outlet.

10. The arrangement of claim 9 further comprising means for permitting a pressure within said housing to be sensed.

11. The arrangement of claim 1 further comprising means for permitting a pressure within said housing to be sensed.

12. The arrangement of claim 1, wherein said communication between said inlet and outlet is closed by selectively moving said valve member to position said first, second and third ports away from said outlet, said communication between said inlet and outlet being opened to said first preselected flow rate by selectively moving said valve member to position said first port adjacent one of said outlet and said inlet, said communication between said inlet and outlet being opened to said second preselected flow rate by selectively moving said valve member to position said second port adjacent one of said outlet and said inlet and said third port adjacent the other of said outlet and said inlet.

13. A valve, comprising:

a housing defining an interior chamber having an inlet and an outlet, said inlet and said outlet being generally perpendicular to one another;

a valve member provided within said interior chamber, the valve member having first, second and third ports arranged about a circumference of said valve member, said first and second ports being generally perpendicular to one another and said second and third ports being generally perpendicular to one another, said first port having a size which is smaller than either of the second and third ports, seat means for sealingly receiving a surface of said valve member adjacent the outlet; and means for selectively moving said valve member within said interior chamber where by communication between said inlet and outlet may be sequentially closed, opened to a first preselected flow rate and then opened to a second preselected flow rate, said second preselected flow rate being greater than said first preselected flow rate.

14. The valve of claim 13, wherein the valve member is generally spherical.

15. The valve of claim 14 wherein said seat means includes a seat retainer member having an integral sight glass provided downstream of said outlet.

16. The valve of claim 14, wherein said means for selectively moving said valve member is adapted to sequentially and selectively position one of said second and third ports adjacent said outlet to permit communication between said inlet and outlet at said second preselected flow rate, then to position said first port adjacent the outlet to permit communication between the inlet and the outlet at said first preselected flow rate and then to selectively position said first, second and third ports away from said outlet to interrupt communication between said inlet and said outlet.

17. The valve of claim 16 further comprising a sight glass provided downstream of said outlet.

18. The valve of claim 16 further comprising means for permitting a pressure within said housing to be sensed.

19. The valve member of claim 13 further comprising sight glass means for permitting a visual observation of a flow out of said outlet.

20. The valve of claim 20 further comprising a sight glass provided downstream of said outlet.

21. The valve of claim 13 further comprising means for permitting a pressure within said housing to be sensed.

22. The arrangementof claim 13, wherein said communication between said inlet and outlet is closed by selectively moving said valve member to position said first, second and third ports away from said outlet, said communication between said inlet and outlet being opened to said first preselected flow rate by selectively moving said valve member to position said first port adjacent one of said outlet and said inlet, said communication between said inlet and outlet being opened to said second preselected flow rate by selectively moving said valve member to position said second port adjacent one of said outlet and said inlet and said third port adjacent the other of said outlet and said inlet.

23. In an arrangement for testing and draining a fire suppression water sprinkler system, having conduit means for supplying water to a plurality of sprinklers, means for sensing the flow of water in said conduit means, and valve means provided downstream of said means for sensing and in communication with said conduit means, the improvement wherein said valve means comprises a housing defining an interior chamber having an inlet and an outlet, said inlet and said outlet being generally perpendicular to one another, a valve member provided within said interior chamber, the valve member having first, second and third ports arranged about a circumference of said valve member, said first and second ports being generally perpendicular to one another and said second and third ports being generally perpendicular to one another, said first port having a size which is smaller than either of the second and third ports, seat means for sealingly receiving a surface of said valve member adjacent the outlet; and means for selectively moving said valve member within said interior chamber whereby communication between said inlet and outlet may be sequentially closed, opened to a first preselected flow rate and then opened to a second preselected flow rate, said second preselected flow rate being greater than said first preselected flow rate.

24. The arrangement of claim 23, wherein in said improvement said communication between said inlet and outlet is closed by selectively moving said valve member to position said first, second and third ports away from said outlet, said communication between said inlet and outlet being opened to said first preselected flow rate by selectively moving said valve member to position said first port adjacent one of said outlet and said inlet, said communication between said inlet and outlet being opened to said second preselected flow rate by selectively moving said valve member to position said second port adjacent one of said outlet and said inlet and said third port adjacent the other of said outlet and said inlet.

* * * * *

UNITED STATES PATENT AND TRADEMARK OFFICE
CERTIFICATE OF CORRECTION

PATENT NO. : 4,741,361

DATED : May 3, 1988

INVENTOR(S) : George J. McHugh

It is certified that error appears in the above-identified patent and that said Letters Patent is hereby corrected as shown below: Title page:

References Cited
U.S. PATENT DOCUMENTS

| | | | |
|---|---|---|---|
| 4,655,078 | 4/1987 | Johnson | 73/168 |
| 350,510 | 10/1886 | Stretch | 73/332 |
| 421,224 | 2/1890 | Applegarth | 251/207 |
| 926,774 | 7/1909 | Schmidt | 174/102R |
| 1,056,344 | 3/1913 | Lester | 251/207 |
| 1,264,775 | 4/1918 | Coles | 251/207 |
| 1,333,048 | 3/1920 | Webster | 251/207 |
| 1,229,038 | 6/1917 | Cornelius | 251/207 |
| 1,666,918 | 4/1928 | Scoville | 184/96 |
| 1,757,237 | 5/1930 | Deutsch | 73/332 |
| 1,825,512 | 9/1931 | Durham et al | 251/207 |
| 2,660,560 | 11/1953 | Pickard | 137/559 |
| 2,859,611 | 11/1958 | Morse | 73/168 |
| 3,134,405 | 5/1964 | White et al | 251/207 |
| 3,386,461 | 6/1968 | Fisher | 251/207 |
| 3,517,554 | 6/1970 | Smith | 73/332 |
| 3,817,097 | 6/1974 | Heroux | 73/168 |
| 3,854,497 | 12/1974 | Rosenberg | 137/557 |
| 4,244,393 | 1/1981 | Lehtinen | 137/559X |

UNITED STATES PATENT AND TRADEMARK OFFICE
CERTIFICATE OF CORRECTION

PATENT NO. : 4,741,361
DATED : May 3, 1988
INVENTOR(S) : George J. McHugh

It is certified that error appears in the above-identified patent and that said Letters Patent is hereby corrected as shown below:

References Cited

FOREIGN PATENT DOCUMENTS 110371 6/1925 Switzerland
42304 8/1908 Switzerland

OTHER PUBLICATIONS

Brochure from Victaulic dated June 1986
Brochure from Sunbelt Marketing, Inc. dated 4/15/86
Brochure from Triple "R" Specialty Co. dated November 1986
Brochure from Fire Sprinkler Fittings Co. dated August 1986
"Standard for the Installation of Sprinkler Systems",
NFPA 13, 1983 Edition, pp. 13-135

Signed and Sealed this

Eleventh Day of July, 1989

*Attest:*

DONALD J. QUIGG

*Attesting Officer* *Commissioner of Patents and Trademarks*